US010333960B2

(12) United States Patent
Zettel, II et al.

(10) Patent No.: US 10,333,960 B2
(45) Date of Patent: Jun. 25, 2019

(54) AGGREGATING NETWORK SECURITY DATA FOR EXPORT

(71) Applicant: ServiceNow, Inc., Santa Clara, CA (US)

(72) Inventors: Kurt Joseph Zettel, II, Nashville, TN (US); Richard Reybok, Jr., Fremont, CA (US); Phillip DiCorpo, San Francisco, CA (US); Simon N. Allen, Sunnyvale, CA (US); Amit Sharma, Cupertino, CA (US); Giora Tamir, San Diego, CA (US)

(73) Assignee: SERVICENOW, INC., Santa Clara, CA (US)

( * ) Notice: Subject to any disclaimer, the term of this patent is extended or adjusted under 35 U.S.C. 154(b) by 85 days.

(21) Appl. No.: 15/585,855

(22) Filed: May 3, 2017

(65) Prior Publication Data
US 2018/0324197 A1    Nov. 8, 2018

(51) Int. Cl.
*H04L 29/06* (2006.01)
*H04L 12/26* (2006.01)
*G06F 16/951* (2019.01)

(52) U.S. Cl.
CPC ........ *H04L 63/1425* (2013.01); *G06F 16/951* (2019.01); *H04L 43/062* (2013.01); *H04L 63/1433* (2013.01)

(58) Field of Classification Search
CPC ............ H04L 63/1416; H04L 63/1408; H04L 63/1441; H04L 63/1458; G06F 21/552
USPC .......................................................... 726/22
See application file for complete search history.

(56) References Cited

U.S. PATENT DOCUMENTS

| | | | |
|---|---|---|---|
| 6,848,015 B2 | 1/2005 | Jones | |
| 7,010,696 B1 | 3/2006 | Cambridge et al. | |
| 7,076,801 B2 | 7/2006 | Gong et al. | |
| 7,100,195 B1 | 8/2006 | Underwood | |
| 7,603,711 B2 | 10/2009 | Scheidell | |
| 7,644,365 B2 | 1/2010 | Bhattacharya et al. | |
| 8,239,668 B1 | 8/2012 | Chen et al. | |
| 8,321,944 B1 | 11/2012 | Mayer et al. | |
| 8,914,406 B1 | 12/2014 | Haugsnes et al. | |
| 9,038,183 B1 | 5/2015 | Haugsnes et al. | |
| 9,137,258 B2 | 9/2015 | Haugsnes | |
| 9,167,001 B1 | 10/2015 | Haugsnes et al. | |
| 2003/0105911 A1 | 6/2003 | Jones | |
| 2003/0133443 A1 | 7/2003 | Klinker et al. | |
| 2003/0154399 A1 | 8/2003 | Zuk et al. | |
| 2004/0221191 A1 | 11/2004 | Porras et al. | |
| 2005/0097256 A1 | 5/2005 | Jones | |

(Continued)

*Primary Examiner* — Evans Desrosiers
(74) *Attorney, Agent, or Firm* — Fletcher Yoder PC

(57) ABSTRACT

Systems and methods are disclosed for computing network operations. For example, methods may include receiving, at a computing device located within a private network, a message sent from a server located outside of the private network, the message including an observable; invoking, within the private network, a search of data associated with the private network to obtain a search result that includes data matching the observable; aggregating, within the private network, data from the search result that matches the observable to obtain a report that includes an indication of the observable, a count of occurrences of the observable, and identification of one or more components associated with the observable; and transmitting the report to the server.

20 Claims, 7 Drawing Sheets

(56) References Cited

U.S. PATENT DOCUMENTS

| | | |
|---|---|---|
| 2005/0193429 A1 | 9/2005 | Demopoulos et al. |
| 2006/0031476 A1 | 2/2006 | Mathes et al. |
| 2007/0214220 A1 | 9/2007 | Alsop et al. |
| 2007/0261112 A1 | 11/2007 | Todd et al. |
| 2008/0034425 A1 | 2/2008 | Overcash et al. |
| 2008/0162474 A1 | 7/2008 | Thong et al. |
| 2008/0276098 A1 | 11/2008 | Florencio et al. |
| 2009/0210424 A1 | 8/2009 | Morohoshi |
| 2009/0328209 A1 | 12/2009 | Nachenberg |
| 2010/0114701 A1 | 5/2010 | Steelberg et al. |
| 2010/0175132 A1 | 7/2010 | Zawadowskiy et al. |
| 2011/0023119 A1 | 1/2011 | Rayes et al. |
| 2012/0109802 A1 | 5/2012 | Griffin et al. |
| 2012/0117509 A1 | 5/2012 | Powell et al. |
| 2012/0159624 A1 | 6/2012 | Konig |
| 2012/0328215 A1 | 12/2012 | Thong et al. |
| 2013/0007870 A1 | 1/2013 | Devarajan et al. |
| 2013/0060810 A1 | 3/2013 | Maman et al. |
| 2013/0247193 A1 | 9/2013 | Zaitsev |
| 2014/0032306 A1 | 1/2014 | Sukornyk et al. |
| 2014/0172495 A1 | 6/2014 | Schneck et al. |
| 2014/0189873 A1 | 7/2014 | Elder et al. |
| 2015/0012339 A1 | 1/2015 | Onischuk |
| 2015/0156213 A1 | 6/2015 | Baker |
| 2015/0207813 A1* | 7/2015 | Reybok ............... H04L 63/145 726/22 |
| 2016/0164890 A1 | 6/2016 | Haugsnes |
| 2016/0226905 A1* | 8/2016 | Baikalov ............ H04L 63/1408 |

\* cited by examiner

US 10,333,960 B2

AGGREGATING NETWORK SECURITY DATA FOR EXPORT

BACKGROUND

Computing networks can be large and complex, consisting of many thousands of hardware and software components. Maintaining and operating a large network can present many challenges. One challenge is maintaining the security of a computing network in the presence of fast evolving network security threats (e.g., malware) that are endemic to the Internet. Network security threats that are not addressed can cause down-time for components or otherwise degrade performance of components within a computing network.

SUMMARY

Disclosed herein are implementations of aggregating network security data for export.

In an implementation, a system is provided for finding information relevant to network security incidents and obtain aggregated results for transmission. The system may include a network interface that is connected to a private network, a memory, and a processor. The memory includes instructions executable by the processor to cause the system to receive, using the network interface, a message sent from a server located outside of the private network, the message including an observable; invoke a search of data associated with the private network to obtain a search result that includes data matching the observable; aggregate data from the search result that matches the observable to obtain aggregated data; generate, based on the aggregated data, a report that includes an indication of the observable, a count of occurrences of the observable, and identification of one or more components associated with the observable; and transmit, using the network interface, the report to the server.

In an implementation, a system is provided for gathering information relevant to network security incidents. The system may include a network interface that is connected to a first network, wherein the first network is outside of a private network; a memory; and a processor. The memory may include instructions executable by the processor to cause the system to transmit, using the network interface, a message to an agent device connected to a private network, the message including an observable; receive, using the network interface, a report from the agent device based on a search of data associated with the private network, wherein the report includes an indication of the observable, a count of occurrences of the observable, and identification of one or more components associated with the observable; and store data associating the one or more components with the observable.

In an implementation, a method is provided for finding information relevant to network security incidents and obtaining aggregated results for transmission. The method may include receiving, at a computing device located within a private network, a message sent from a server located outside of the private network, the message including an observable; invoking, within the private network, a search of data associated with the private network to obtain a search result that includes data matching the observable; aggregating, within the private network, data from the search result that matches the observable to obtain aggregated data; generating, based on the aggregated data, a report that includes an indication of the observable, a count of occurrences of the observable, and identification of one or more components associated with the observable; and transmitting the report to the server.

These and other aspects of the present disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
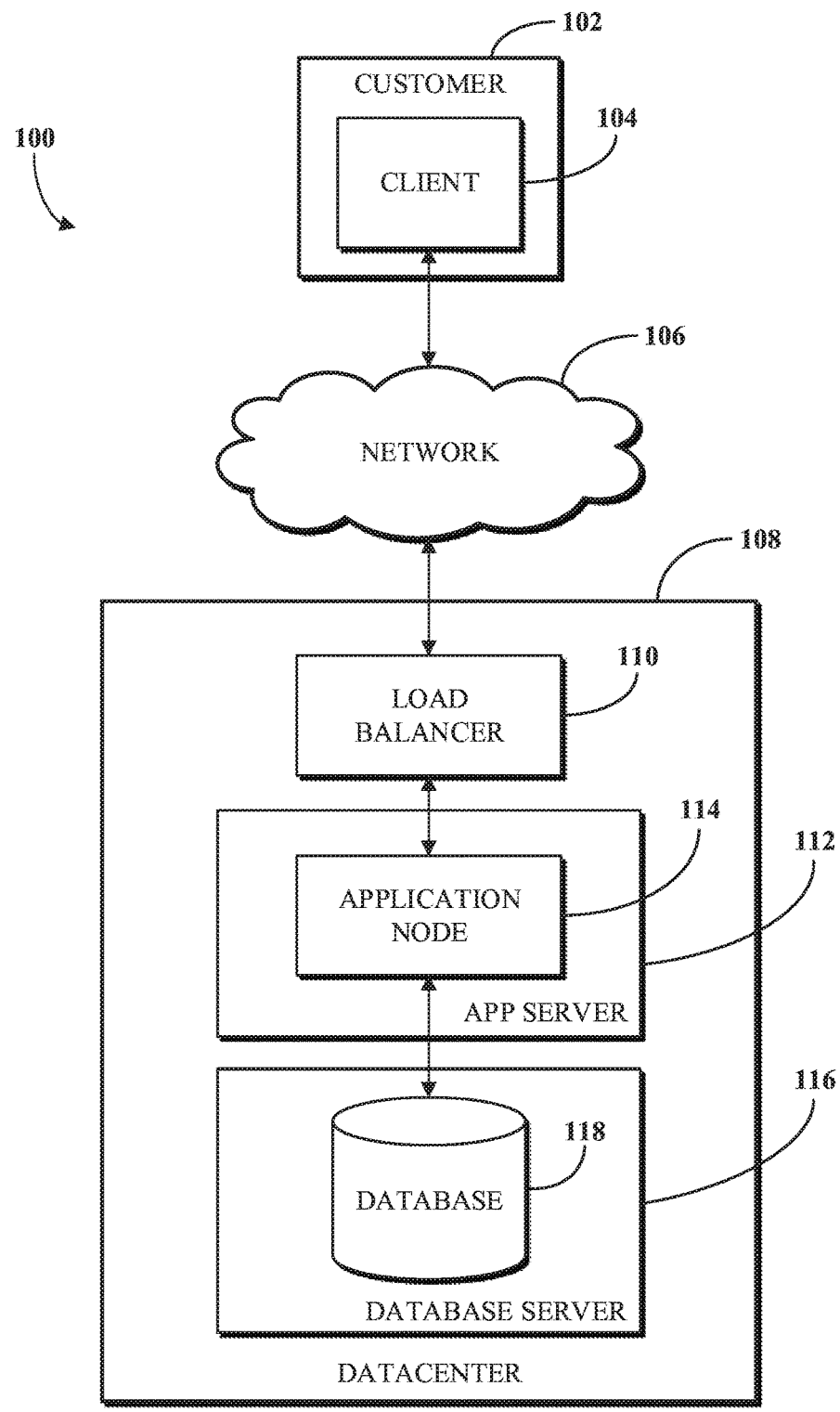
FIG. 1 is a diagram of an example of an electronic computing and communications system.

This document includes disclosure of systems, apparatus, and methods for conducting network security related searches of a private network (e.g., a firewalled or otherwise secured network) that are managed by an external service provider (e.g., a software-as-a-service provider). A network security application that is provided by an external service provider may need to interact a customer's systems, such as SIEM (Security Information & Event Management) systems and Log Stores. These systems are tools, such as those provided by Splunk and Elasticsearch, which contain logs from multiple sources within a customer's environment (e.g., a private network). These logs may contain sensitive information (e.g., user credentials) that may not be needed by the service provider and may pose a network security risk if exposed outside of the customer's private network.

To mitigate this risk, searches can be conducted and results analyzed and aggregated by a machine operating within a private network before a summary of the pertinent results are reported to an external service provider. In response to a message from the service provider, one or more searches of data for the private network may be performed within the private network. The search(es) may be targeted to find observables of interest that are specified by the service provider. The results of the search(es) may then be aggregated to omit sensitive components of the data that are not required by the service provider to implement its network security services. Aggregating the search results may include paging through the results, counting occurrences of observables, extracting specific information related to the observables (e.g., identification of hosts on which the observables are found), and/or bucketing the observable occurrence information by time intervals. For example, the search(es) may be conducted and the results may be aggregated by an agent device that operates within the private network. Thus, the exfiltration of sensitive data may be prevented and associated risks may be mitigated.

As used in this document, the term "observable" refers to data that represents properties or events related to the operation of networks and network-connected devices. For example, an observable may include a value (e.g., an MD5 hash) and the observable is present in a network device if a value associated with the network device (e.g., a hash of a file on the network device) matches the value (e.g., MD5 hash) of the observable. For example, an observable may be a STIX (Structured Threat Information eXpression) observable. For example, an observable may be a component of an indicator of compromise (IoC). An IoC may convey specific observable patterns combined with contextual information intended to represent artifacts and/or behaviors of interest within a cyber security context. An IoC may be a container of one or more observables. Some illustrative examples of observables include an IP address, a domain, a uniform resource locator (URL), a host name, a hash, an MD5, an executable file name, a registry entry, etc. In some implementations, observables (e.g., IoC or STIX observables) may be shared between organizations.

Implementations of this disclosure provide technological improvements particular to computer networks, for example, the provision of network security services to a private network from outside of the private network may be improved. Computer network-specific technological problems, such as exfiltration of sensitive data in the course of providing security services for a private network, can be wholly or partially solved by implementations of this disclosure. For example, searches initiated by an external service provider may be conducted by a device operating within a private network and the results may be aggregated to omit sensitive data before reporting results of the searches to the service provider. Implementations of this disclosure can thus introduce new and efficient improvements in the ways in which network security related data may be gathered and processed to reduce network security vulnerabilities and mitigate identified network security threats.

To describe some implementations in greater detail, reference is first made to examples of hardware structures. FIG. 1 is a diagram of an example of an electronic computing and communications system 100. As used herein, the term "electronic computing and communications system," or variations thereof, can be, or include, a distributed computing system, such as a client-server computing system, a cloud computing system, a clustered computing system, or the like.

The system 100 can include one or more customers 102. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit, or as a combination of physical units. In some implementations, a single physical unit can include multiple clients.

The client 104 can be an instance of an application running on a customer device associated with the customer 102. The system 100 can include any number of customers and/or clients and/or can have a configuration of customers and/or clients different from that generally illustrated in FIG. 1. For example, and without limitation, the system 100 can include hundreds or thousands of customers, and at least some of the customers can include and/or be associated with any number of clients. A customer can include a customer network and/or domain. For example, and without limitation, the client 104 can be associated and/or communicate with a customer network and/or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers and/or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated and/or communicate with one or more datacenter networks and/or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, and/or path or using a distinct connection point, link, and/or path. A connection point, link, or path can be wired, wireless, or a combination thereof.

The network 106 can include, for example, the Internet, and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, and/or any combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals and/or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 and/or the database server 116 can be a computing system, which can include one or more computing devices, such as a desktop computer, a server computer, or any other computer capable of operating as a server. In some implementations, the application server 112 and/or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the current database 118 of the database server 116.

The application server 112 can include any suitable number of application nodes, depending upon a system load and/or other characteristics associated with the application server 112. For example, and without limitation, the application server 112 can include two or more nodes forming a node cluster. The application nodes implemented on a single application server 112 may run on different hardware servers.

The database server 116 can be configured to store, manage, or otherwise provide data for delivering services to the client 104 over a network. The database server 116 may include a data storage unit, such as a current database 118, which can be accessible by an application executed on the application server 112. The current database 118 may be implemented as a relational database management system (RDBMS), an object database, an XML database, a configuration management database (CMDB), a management information base (MIB), one or more flat files, or the like, or a combination thereof. By way of non-limiting example, the system 100, in some implementations, can include an XML database and a CMDB. While limited examples are described, the current database 118 can be configured as and/or comprise any suitable database type. Further, the system 100 can include one, two, three, or any suitable number of databases configured as and/or comprising any suitable database type and/or combination thereof.

In some implementations, the database 118 can be configured as and/or comprise a CMDB. A CMDB can comprise a plurality of configuration items (CIs). A CI can be a CMDB record that represents an infrastructure entity, device, and/or units of the system 100. For example, the customer 102, the client 104, the network 106, the datacenter 108, the load balancer 110, the application server 112, the application node 114, the database server 116, the current database 118, or any other element, portion of an element, or combination of elements of the electronic computing and communications system 100 can be represented in the CMDB by a CI.

The CMDB can include information describing the configuration, the role, or both, of an element of the system 100. In some implementations, an MIB can include one or more databases listing characteristics of the elements of the system 100. In some implementations, an object identifier (OID) can represent object identifiers of objects or elements in the MIB.

One or more databases (e.g., the current database 118), tables, other suitable information sources, and/or portions or combinations thereof can be stored, managed, or otherwise provided by one or more of the elements of the system 100 other than the database server 116, such as the client 104 and/or the application server 112.

Some or all of the systems and techniques described herein can operate and/or be executed on or by the servers associated with the system 100. For example, an STEM or Log Store of the customer 102 can be searched locally for observables in response to a message by a software module executed on the application node 114, and the database 118 may be updated based on aggregated results of a search received by the application server 112. In some implementations, the systems and methods described herein, portions thereof, or combinations thereof, can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, and/or both can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the current database 118, and the secondary datacenter can include a secondary database. The secondary database can include an exact or substantially exact mirror, copy, or replication of the primary database. The primary database and/or the secondary database can be implemented as a relational database management system (RDBMS), an object database, an XML database, one or more flat files, or the like.

An application node implemented within a distributed computing environment can connect to and/or communicate with the primary database, which can be associated with the datacenter with which the application node is associated, and/or associated with another datacenter. For example, a primary datacenter can include a primary database and a first set of application nodes. A secondary datacenter can include a secondary database and a second set of application nodes. The application nodes of the first and second sets can provide a service or application to remote clients, and can read and/or write data in the primary database. The secondary database can mirror changes made to the primary database and prevent write operations from being performed directly on the secondary database. In the event that a failover condition associated with the primary database is identified, the secondary database can operate as the primary database and can allow read and/or write access to data. The primary database can then operate as the secondary database, mirror the new primary database, and prevent direct write access to the new secondary database.

A distributed computing system can allocate resources of a computer network using a multi-tenant or single-tenant architecture, for example. Allocation of resources in a multi-tenant architecture can include installations and/or instantiations of one or more servers, such as application servers, database servers, and/or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, and/or both can distinguish between and segregate data and/or other information of the various customers using the system.

In a single-tenant infrastructure (which can also be referred to as a multi-instance architecture), separate web servers, application servers, database servers, and/or combinations thereof can be provisioned for at least some customers and/or customer sub-units. Customers and/or customer sub-units can access one or more dedicated web servers, have transactions processed using one or more dedicated application servers, and/or have data stored in one or more dedicated database servers, catalogs, and/or both. Physical hardware servers can be shared such that multiple installations and/or instantiations of web servers, application servers, database servers, and/or combinations thereof can be installed on the same physical server. An installation can be allocated a portion of the physical server resources, such as RAM, storage, communications bandwidth, and/or processor cycles.

A customer instance can include multiple web server instances, multiple application server instances, multiple database server instances, and/or a combination thereof. The server instances can be physically located on different physical servers and can share resources of the different physical servers with other server instances associated with other customer instances. In a distributed computing system, multiple customer instances can be used concurrently. Other configurations and/or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, and/or a combination thereof.

Figure 2:
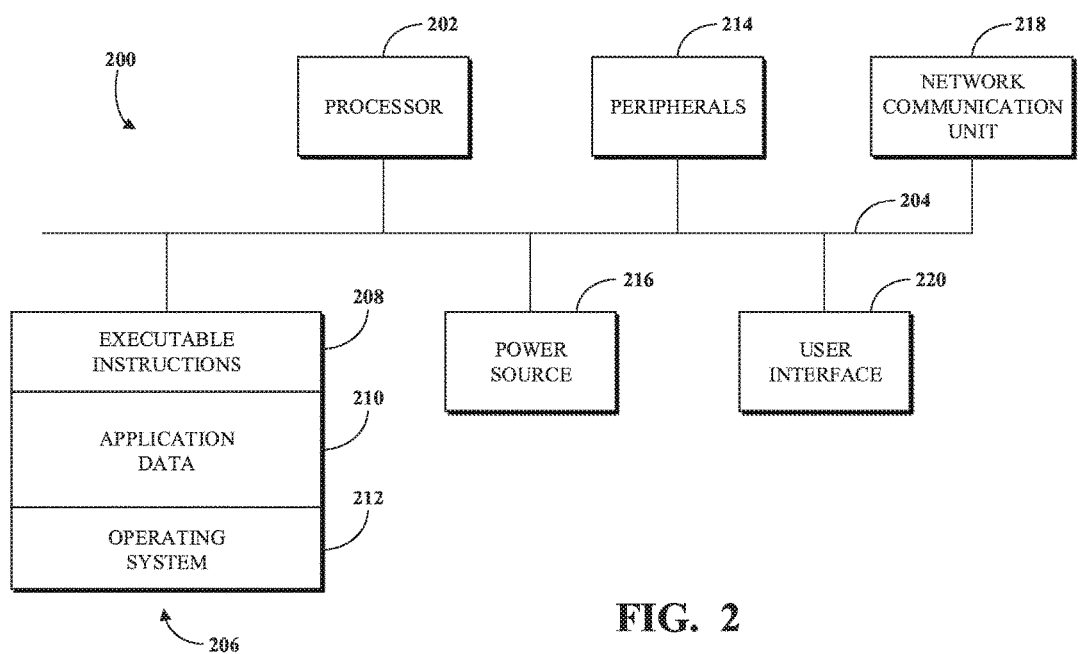
FIG. 2 is a block diagram of an example internal configuration of a computing device of the electronic computing and communications system shown in FIG. 1.

FIG. 2 generally illustrates a block diagram of an example internal configuration of a computing device 200, such as a client 104 and/or a server, such as an application server 112 and/or a database server 116, of the electronic computing and communications system 100 as generally illustrated in FIG. 1. As previously described, a client and/or server can be a computing system including multiple computing devices and/or a single computing device, such as a mobile phone, a tablet computer, a laptop computer, a notebook computer, a desktop computer, a server computer, and/or other suitable computing devices. A computing device 200 can include components and/or units, such as a processor 202, a bus 204, a memory 206, peripherals 214, a power source 216, a network communication unit 218, a user interface 220, other suitable components, and/or any combination thereof.

The processor 202 can be a central processing unit (CPU), such as a microprocessor, and can include single or multiple processors, having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired and/or networked, including wirelessly networked. In some implementations, the operations of the processor 202 can be distributed across multiple physical devices and/or units that can be coupled directly or across a local area or other type of network. In some implementations, the processor 202 can include a cache, or cache memory, for local storage of operating data and/or instructions. The operations of the processor 202 can be distributed across multiple machines, which can be coupled directly or across a local area or other type of network.

The memory 206 can include volatile memory, non-volatile memory, and/or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), and/or any form of non-volatile memory capable of persistent electronic information storage, such as in the absence of an active power supply. The memory 206 can include another type of device, or multiple devices, now existing or hereafter developed, capable of storing data and/or instructions for processing by the processor 202. The processor 202 can access and/or manipulate data in the memory 206 via the bus 204. Although shown as a single block in FIG. 2A, the memory 206 can be implemented as multiple units. For example, a computing device 200 can include volatile memory, such as RAM, and persistent memory, such as a hard drive or other storage. The memory 206 can be distributed across multiple machines, such as network-based memory or memory in multiple machines performing the operations of clients and/or servers.

The memory 206 can include executable instructions 208; data, such as application data 210; an operating system 212; or a combination thereof for immediate access by the processor 202. The executable instructions 208 can include, for example, one or more application programs, which can be loaded and/or copied, in whole or in part, from non-volatile memory to volatile memory to be executed by the processor 202. The executable instructions 208 can be organized into programmable modules and/or algorithms, functional programs, codes, code segments, and/or combinations thereof to perform various functions described herein. For example, the executable instructions 208 can include instructions to invoke a search of data associated with a private network to obtain a search result that includes data matching an observable; aggregate data from the search result that matches the observable to obtain a report that includes an indication of the observable, a count of occurrences of the observable, and identification of one or more components associated with the observable; and transmit the report to an external server.

The application data 210 can include, for example, user files; database catalogs and/or dictionaries; configuration information for functional programs, such as a web browser, a web server, a database server; and/or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself and/or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, a client and/or server can omit the peripherals 214. In some implementations, the power source 216 can be a battery, and the computing device 200 can operate independently of an external power distribution system. Any of the components of the computing device 200, such as the peripherals 214 or the power source 216, can communicate with the processor 202 via the bus 204. Although depicted here as a single bus, the bus 204 can be composed of multiple buses, which can be connected to one another through various bridges, controllers, and/or adapters.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; and/or any other human and machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3:
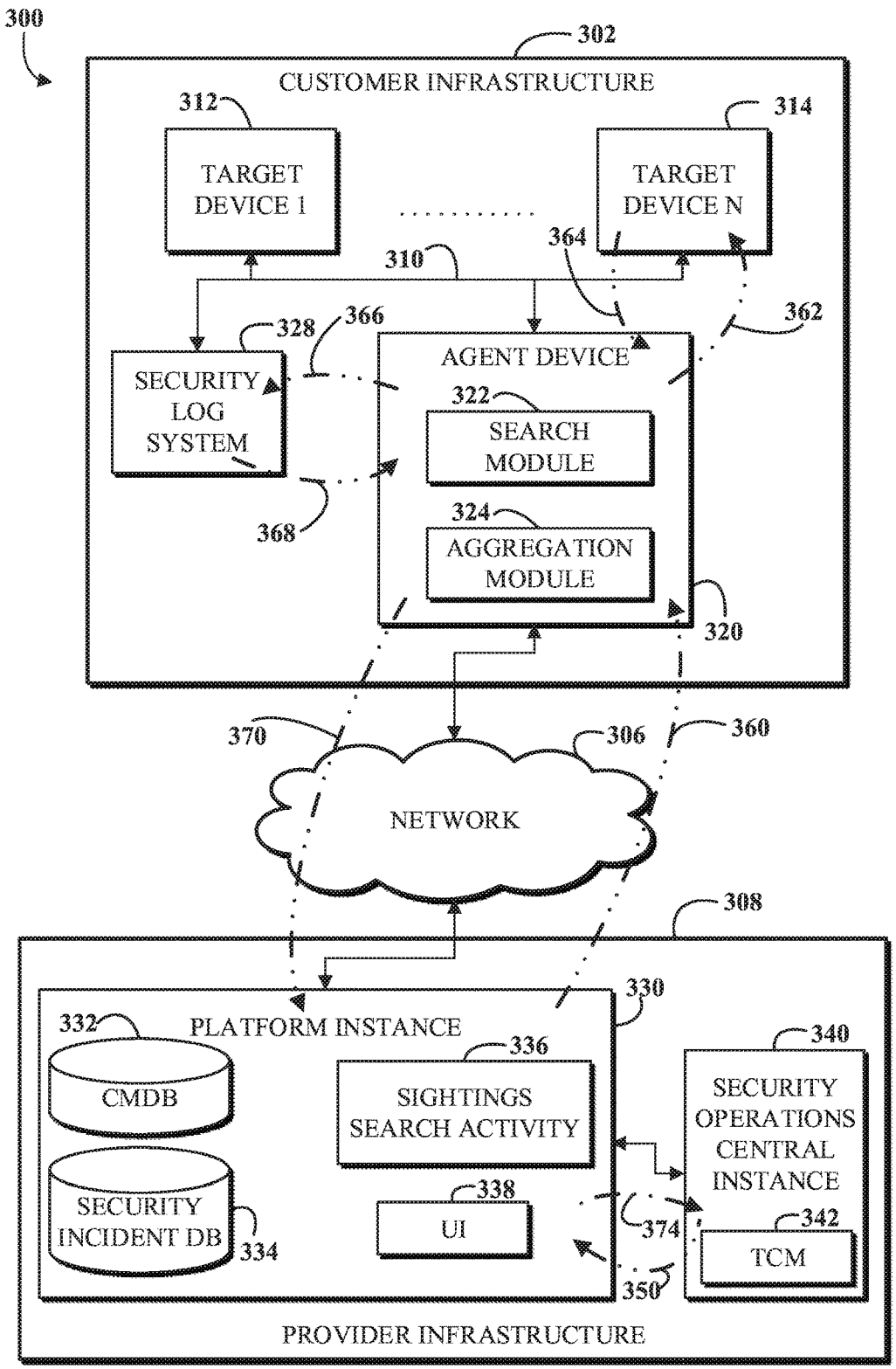
FIG. 3 is a block diagram of an implementation of a system usable for finding and locally analyzing information relevant to network security incidents within a private network and reporting aggregated results to an external software as a service provider.

FIG. 3 is a block diagram of an implementation of a system 300 usable for finding and locally analyzing information relevant to network security incidents within a private network and reporting aggregated results to an external software as a service provider. The system 300 can, for example, be implemented using some or all of electronic computing and communications system 100. For example, network 306 can be implemented using network 106, and platform instance 330 can be implemented using platform software executing on one or more application nodes 114 and data stored on one or more databases 118. For example, the platform software may be used to implement sightings search activity module 336 and the user interface 338. For example, the CMDB 332 and the security incident database 334 may be implemented by storing their associated data in databases 118.

The system 300 includes a customer infrastructure 302 that may communicate, via a network 306 (e.g., the Internet or some other wide area network), with a provider infrastructure 308. Devices and software in the provider infrastructure 308 may be used to provide operational management functions for computing resources in the customer infrastructure 302. For example, a provider environment may be bounded by one or more datacenters 108, as shown in FIG. 1. For example, a customer environment may be bounded by one or more firewalls that separate the customer environment from the network 306.

The customer infrastructure 302 may include a number of devices connected by a customer network 310 (e.g., a firewalled local area network), including, for example, a target device 1 312 through a target device N 314, an agent device 320, and a security log system 328. The provider infrastructure 308 may include a platform instance 330 (e.g., running on a server device). The platform instance 330 may manage operations of the computing resources in the customer infrastructure 302. The platform instance 330 includes a CMDB 332, which may store models of the computing resources in the customer infrastructure 302, including configuration items for target devices (e.g., the target device N 314) and for software components installed or running on the target devices in the customer infrastructure 302. The platform instance 330 can initiate discovery of computing resources in the customer infrastructure 302 by instructing the agent device 320 to invoke discovery probes and return probe data to the platform instance 330.

The platform instance 330 may include a security incident database 334 that stores information relevant to network security and the handling of network security incidents. For example, records for security incidents and records for observables related to security incidents may be stored in the security incident database 334. The platform instance 330 may include a sightings search activity module 336 that is configured to initiate searches for occurrences of observables in the customer infrastructure 302 by sending messages (e.g., queries) to the agent device 320, persist information obtained about observables in the security incident database 334, and identify relationships between security incidents from the security incident database 334 and configuration items from the CMDB 332. For example, the sightings search activity module 336 may implement the technique 400 of FIG. 4.

The agent device 320 may include a search module 322 that is configured to invoke searches of data of the customer infrastructure 302 responsive to messages (e.g., queries) from the platform instance 330 to obtain search results. In some implementations, the search module 322 may invoke searches of the security log system 328 for occurrences of observables included in a message from the platform instance 330. In some implementations, the search module 322 may invoke searches of data stored on other devices in the customer infrastructure 302 (e.g., the target device N 314) using discovery techniques in response to a message from the platform instance 330. The agent device 320 may include an aggregation module 324 that is configured to aggregate data from the search results that match an observable to obtain a report that includes an indication of the observable, a count of occurrences of the observable, and identification of one or more components in the customer infrastructure 302 associated with the observable. These reports may omit sensitive data recovered by the searches while providing information need by the platform instance 330 to enable certain network security related functions. The agent device 320 may transmit these reports to the platform instance 330, which may avoid exfiltration of sensitive data from the customer infrastructure 302. For example, the agent device may implement the technique 500 of FIG. 5.

The platform instance 330 may include a user interface 338 that enables a user (e.g., a system administrator of the customer infrastructure 302) to access information about the configuration and status of computing resources in the customer infrastructure 302. In some implementations, the user interface 338 may be accessed by a user from a remote device using a web browser. The user interface 338 may enable a user to review the status of a network security incident and/or requesting a sightings search for observables related to the network security incident. For example, the user interface 338 may generate the display region 610 of FIG. 6 and/or the display region 710 of FIG. 7.

The provider infrastructure 308 may also include a security operations central instance 340. The security operations central instance 340 is a resource that may facilitate the sharing of updated network security threat intelligence amongst multiple customers that use the provider infrastructure 308. The security operations central instance 340 may include a trusted circle management module 342 that is configured to maintain groups of customers that have been selected or have elected to share network security threat information (e.g., a set of malicious IP addresses and hashes used in an attack) amongst the members of a respective group. The customers in a trusted circle group may be selected because they a similarly situated (e.g., operating in the same region or in the same industry) or are related in some other manner. The security operations central instance 340 may be responsible for brokering messages between platform instances (such as platform instance 330) associated with customers that are members of a trusted circle group. For example, when a member of the group shares network security threat information or submits a query, this information and/or a query may be forwarded by the security operations central instance 340 to platform instances associated with members of the group. Each member in that circle may then reply with some summarized data of whether these indicators were seen within their respective networks. For example, this may help a user to answer the question: Is this attack affecting my peers or supply chain? In some cases, the platform instance 330 may initiate a sightings search for one or more observables based on a trusted circle alert or a query from the security operations central instance 340.

In an example scenario, the security operations central instance 340 sends an alert message 350 (e.g., a trusted circle alert message) to the platform instance 330. For example, the alert message 350 may include a query with one or more observables associated with a networks security threat detected by a member of a trusted circle group. The platform instance 330 generates a network security incident based on the alert message 350 and presents the network security incident to a user (e.g., a system administrator or a security operations officer) through the user interface 338. For example, the network security incident may be presented in the display region 610 of FIG. 6. In response, the user sends a request for a sightings search to be performed in the customer infrastructure 302 for data matching an observable associated with the security incident.

In the example scenario, the platform instance 330 sends a message 360 to the agent device 320. The message includes an observable (e.g., an observable associated with a security incident and/or an observable included in a trusted circle alert or query). Responsive to the message, the search module 322 invokes searches of data in the customer infrastructure for occurrences of the observable. For example, the search module invokes a discovery probe 362 against the target device N 314 and searches the resulting probe data 364 to find occurrences of the observable. The search module 322 also invokes a search of data in the security log system 328 (e.g., a Splunk or Elasticsearch log store) using one or more query messages 366 supported by an API (Application Programming Interface) of the security log system 328) to obtain one or more query responses 368 and to find occurrences of the observable. In this manner, search results may be collected from various sources within the customer infrastructure 302.

In the example scenario, the aggregation module 324 parses the search results from various sources in the customer infrastructure and aggregates the search results to obtain a report 370 of information pertinent to network security functions provided by the platform instance 330. The report may omit data from the search results, including some sensitive data (e.g., user names or credentials). The agent device 320 transmits the report 370 to the platform instance 330 via the network 306.

In the example scenario, the sightings search activity module 336 receives the report 370 and stores information about the observable from the report in the security incident database 334. The sightings search activity module 336 may identify, based on the report 370, a relationship between a network security incident associated with the observable and a configuration item stored in the CMDB 332 representing one of the one or more components in the private network. Data reflecting an identified relationship between the configuration item and the network security incident may be stored in the security incident database 334 to associate the configuration item with the network security incident.

In the example scenario, sightings search activity module 336 determines a score for the network security incident associated with the observable based on the report. For example, the score may be determined based on a count of occurrences of the observable found in the data of the customer infrastructure 302. For example, the score may be determined based on the association of one or more hosts (e.g., the target device N 314) in the customer infrastructure 302 with an observable associated with the security incident. Scores and other information derived from the report 370 may be presented to a user (e.g., a system administrator or a security operations officer) through the user interface 338. For example, display region 710 of FIG. 7 may be generated and presented to a user to show an identified relationship between a network security incident and one or more configuration items representing computing resources in the customer infrastructure 302.

In the example scenario, a trusted circle query response 374 based on the report 370 is transmitted to the security operations central instance 340 for sharing with other members of a trusted circle group. For example, trusted circle query response 374 may include the entire report 370 or a subset of the data in the report 370. For example, trusted circle query response 374 may include one or more scores associated with an observable or a network security incident.

The modules of system 300 may be implemented directly in hardware, firmware, software executed by hardware, circuitry, or a combination thereof. For example, modules may be implemented using a machine-readable program or other computer-executable instructions, such as instructions or programs described according to JavaScript, C, or other such instructions.

Alternative implementations of system 300 are possible. For example, aspects of system 300 may be implemented using additional, less, or differently configured modules, devices, or components than those shown. For example, system 300 may omit or not use some or all of the security operations central instance 340. For example, the functionality described with respect to search module 322 and the aggregation module 324 may be implemented in a fewer or greater number of modules and may, for example, be implemented in a single software program. For example, CMDB 332 and security incident database 334 may be implemented on separate database servers (e.g., the database server 116).

Figure 4:
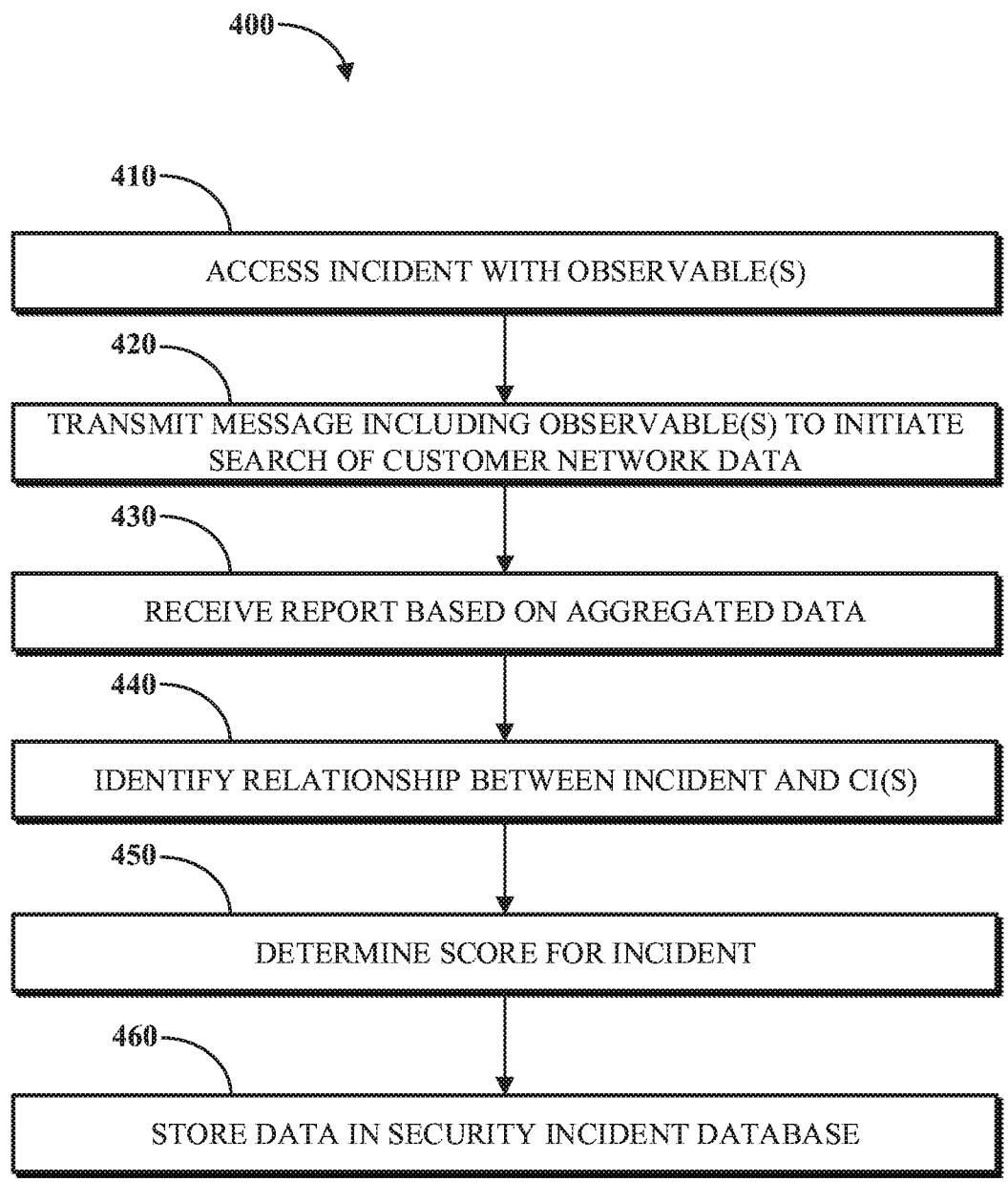
FIG. 4 is a logic flowchart illustrating an example of a technique for conducting a sightings search for observables related to a network security incident to facilitate response to the network security incident.

FIG. 4 is a flowchart illustrating an example of a technique 400 for conducting a sightings search for observables related to a network security incident to facilitate response to the network security incident in an electronic computing and communications system, such as the system 100 as generally illustrated in FIG. 1. In some implementations, the technique 400 can be executed using computing devices, such as the systems, modules, and devices described with respect to FIGS. 1, 2, and 3. In some implementations, the technique 400 can be performed, for example, by executing a machine-readable program or other computer-executable instructions, such as instructions or programs described according to JavaScript, C, or other such instructions. The steps, or operations, of the technique 400 or any other technique, method, process, or algorithm described in connection with the implementations disclosed herein can be implemented directly in hardware, firmware, software executed by hardware, circuitry, or a combination thereof.

The example technique 400 includes accessing 410 an incident with one or more observables, transmitting 420 a message including one or more observables to initiate a local search of customer network data, receiving 430 a report based on aggregated data that has been determined locally within the customer network, identifying 440 a relationship between the incident and one or more configuration items, determining 450 a score for the incident based on the report, and storing 460 data in the security incident database based on the report. In some implementations, the technique 400 may enable gathering information relevant to network security incidents.

Data for a network security incident is accessed 410. The incident may be associated with one or more observables (e.g., an IP address, a domain, a host name, a hash, an executable file name, a registry entry, etc.). For example, for a network security incident that has occurred in a private network (e.g., a firewalled customer network) may be accessed 410 and presented to a user (e.g., a network administrator or security operations officer) in a user interface (e.g., the user interface 338). For example, data for a network security incident may be presented in the display region 610 of FIG. 6. In some implementations, the incident data may have been provided by a SIEM (security information and event management) system operated for and/or within a customer network. In some implementations, the incident data may be based on and/or accessed 410 responsive to a network security threat alert message or search request from a central instance (e.g., the security operations central instance 340) that manages the sharing of network security threat intelligence among a group of customers (e.g., a trusted circle). For example, data for the incident may be accessed 410 by the platform instance 330 of FIG. 3.

The example technique 400 includes transmitting 420 a message to an agent device (e.g., the agent device 320) connected to a private network, the message including an observable that will be searched for in data of a private network. For example, the message may include a query including the observable. In some implementations, information about a network security incident that is associated with the observable may have been presented to a user (e.g., a system administrator or a security operations officer) and the message is transmitted 420 responsive to a command received from the user to perform a search based on the observable. For example, the command may be received through a user interface (e.g., the user interface 338) presenting the display region 610 of FIG. 6. In some implementations, the message is transmitted 420 responsive to an alert received (e.g., from the security operations central instance 340), where the alert includes the observable and the alert is based on network security threat information shared among a group of associated private networks that includes the private network. For example, the message may be transmitted 420 using a network interface (e.g., of a server running the platform instance 330) connected to a network (e.g., in provider infrastructure 308) that is outside of the private network. In some implementations, the message is sent in response to a query sent by the agent device (e.g., if the agent device behind a firewall that prevents the platform instance from initiating a connection with the agent device).

The example technique 400 includes receiving 430 a report from the agent device based on a search of data associated with the private network, wherein the report includes an indication of the observable, a count of occurrences of the observable, and identification of one or more components associated with the observable. The indication of the observable may directly or indirectly identify the observable. For example, the indication of the observable may be a copy of the observable or an identifier associated with the observable. For example, the count of occurrences of the observable may be a total count of all occurrences of the observable found in searches of data of the private network. In some implementations, the count of occurrences of the observable may be one of multiple counts of the observable. For example, occurrences of an observable may be associated with respective times (e.g., having timestamps) and counts of the observable occurring within respective time intervals of an analysis period may be determined and include in the report. These counts, including the count, may comprise a histogram. For example, the one or more components may be software components and/or hardware components in the private network. For example, the one or more components may be represented by configuration items in a configuration management database (e.g., the CMDB 332). For example, the identification of one or more components associated with the observable may include one or more host names of devices (e.g., target device 1 312 or target device N 314) in the private network. The report may have been generated by aggregating search results found by the agent device within the private network. The report may omit sensitive data that is not needed by a system implementing the technique 400 to facilitate sightings searches and associated network security functions. In this manner, network security risks caused by exposing sensitive data outside of the private network may be avoided. For example, the technique 500 of FIG. 5 may have been implemented by the agent device 320 to generate the report in response to the message.

The example technique 400 includes identifying 440, based on the report, a relationship between a network security incident associated with the observable and a configuration item representing one of the one or more components in the private network. For example, identifying 440 the relationship may include searching a CMDB (e.g., the CMDB 332) for a configuration item matching the identification (e.g., a host name, an IP address, or some other identifier of a computing resource) of the one or more components associated with the observable included in the report. For example, the configuration item may be associated with a network security incident adding an identifier (e.g., a pointer to) the configuration item to a record for the network security incident to reflect the identified relationship. In some implementations, the identified relationship may be presented to a user through a user interface (e.g., the user interface 338), such as by presenting the display region 710 of FIG. 7.

In some implementations, one or more hosts in the private network that are associated with occurrences of the observable may be identified based on the report. For example, the identification of the one or more components associated with the observable included in the report may include one or more host names. For example, the one or more hosts may be identified by based in part on searching a CMDB (e.g., the CMDB 332) using the identification of the one or more components associated with the observable included in the report.

The example technique 400 includes determining 450 a score for a network security incident associated with the observable based on a count of occurrences of the observable. The score may reflect an estimate of the impact of the network security incident on the private network. For example, the score may be determined 450 as a linear combination of counts of occurrences in the private network for observables associated with the network security incident. In some implementations, a score for a network security incident associated with the observable is determined 450 based on the identification of the one or more hosts in the private network that have been identified based on the report. For example, example the score may be determined 450 based on a count of the number of hosts in the private network that have been identified as associated with (e.g., impacted by) the network security incident. In some implementations, the score may depend on weights for respective hosts or other types of computing resources in the private network represented by configuration items that reflect the relative importance of those computing resources to the operations of the private network.

The example technique 400 includes storing 460 data associating the one or more components with the observable. For example, the one or more components (e.g., hardware components or software components) may be associated with the observable by storing 460 both an identifier of (e.g., a pointer to a representative CI) the component and an identifier of the observable (e.g., a copy of the observable) in a record for a network security incident (e.g., stored in the security incident database 334). In some implementations, data, based on the report, reflecting occurrences of the observable detected with the private network may be stored in a database with records for observables (e.g., the security incident database 334). For example, a record for the observable may be updated to include an identifier of one or more configuration items that have been associated with occurrences of the observable within the private network.

Although the technique 400 is shown as a series of operations for clarity, implementations of the technique 400 or any other technique, process, or algorithm described in connection with the implementations disclosed herein can be performed in various orders or concurrently. Additionally, operations in accordance with this disclosure can be performed with other operations not presented and described herein. For example, an alert from a shared network security server (e.g., the security operations central instance 340) that includes the observable may be received and the message may be transmitted to an agent device operating in the private network in response to the alert message. Furthermore, one or more aspects of the systems and techniques described herein can be omitted. For example, determining 450 a score for the incident is an operation that may be omitted.

Figure 5:
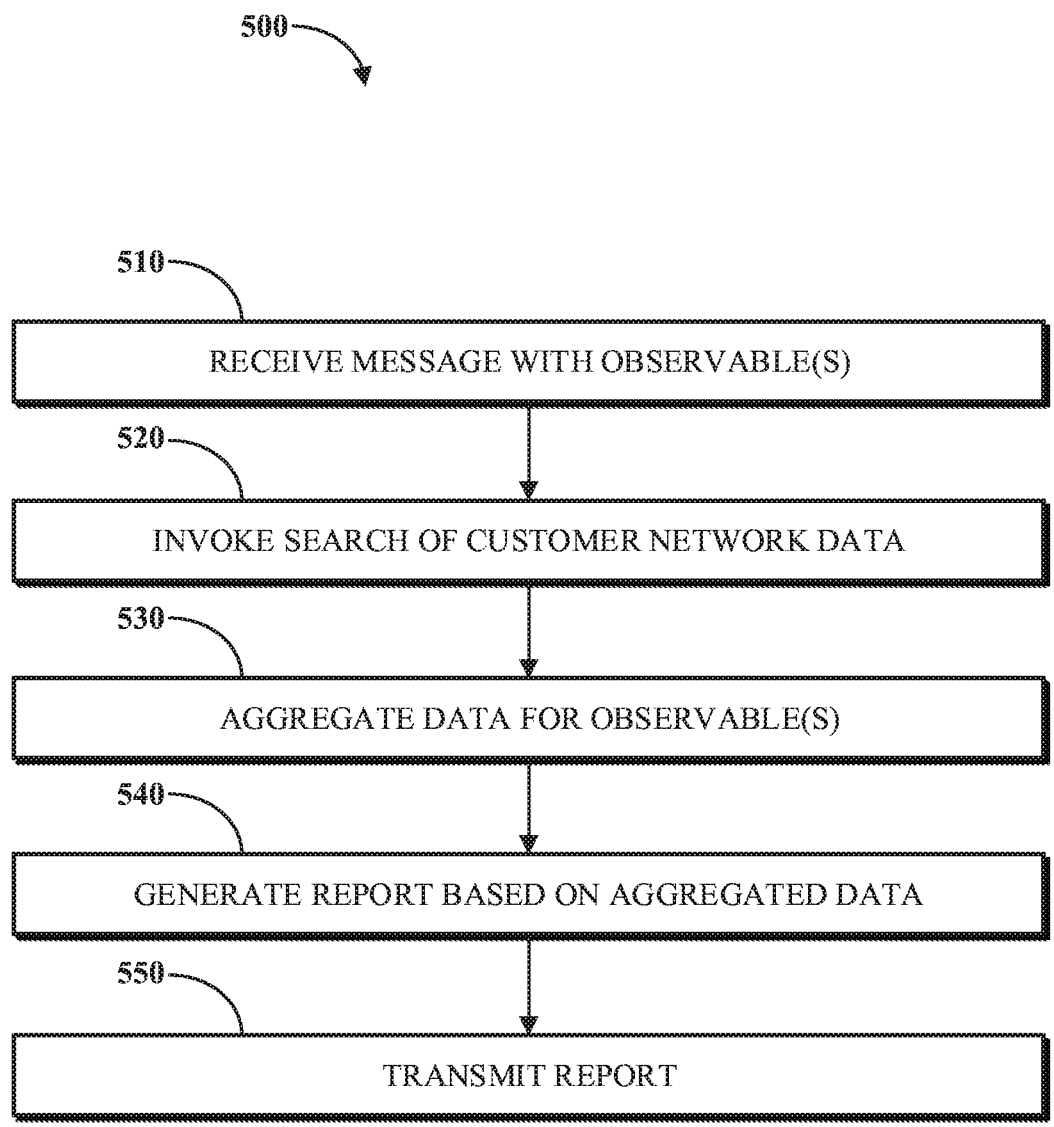
FIG. 5 is a logic flowchart illustrating an example of a technique for conducting a search for observables locally within a private network, aggregating the results of the search to omit sensitive data, and transmitting the aggregated results to an external service provider.

FIG. 5 is a flowchart illustrating an example of a technique 500 for conducting a search for observables locally within a private network, aggregating the results of the search to omit sensitive data, and transmitting the aggregated results to an external service provider in an electronic computing and communications system, such as the system 100 as generally illustrated in FIG. 1. In some implementations, the technique 500 can be executed using computing devices, such as the systems, modules, and devices described with respect to FIGS. 1, 2, and 3. In some implementations, the technique 500 can be performed, for example, by executing a machine-readable program or other computer-executable instructions, such as instructions or programs described according to JavaScript, C, or other such instructions. The steps, or operations, of the technique 500 or any other technique, method, process, or algorithm described in connection with the implementations disclosed herein can be implemented directly in hardware, firmware, software executed by hardware, circuitry, or a combination thereof.

The example technique 500 includes receiving 510 a message with one or more observables, invoking 520 a search of data for a customer network, aggregating 530 the data for the one or more observables, generating 540 a report based in the aggregated data, and transmitting 550 the report to server device that operates outside of the customer network. In some implementations, the technique 500 may enable finding and locally analyzing information relevant to network security incidents within a private network and reporting aggregated results to an external software as a service provider.

The example technique 500 includes receiving 510, at a computing device located within a private network, a message sent from a server located outside of the private network, the message including an observable. The observable may include, for example, an IP address, a domain, a URL, a host name, a hash, an MD5, an executable file name, a registry entry, etc. In some implementations, multiple observables may be included in a message. The message may be received 510 using a network interface that is connected to the private network. For example, the message may be received 510 by the agent device 320 operating in a private network of the customer infrastructure 302 from the platform instance 330 running on an application server (e.g., the application server 112) operating in the provider infrastructure 308, outside of the private network. For example, the message may be received 510 using a network interface (e.g., the network communication unit 218) of the agent device 320.

The example technique 500 includes invoking 520 a search of data associated with the private network to obtain a search result that includes data matching the observable. For example, the search may be invoked 520 from a device located within the private network. In some implementations, invoking 520 a search may include invoking a search of a log store within the private network. For example, the log store may be a Splunk log store or an Elasticsearch log store for the private network. In some implementations, invoking 520 a search may include invoking a discovery probe against a target device operating in the private network. In some implementations, invoking 520 a search may include invoking multiple searches, including follow up searches based on an initial search result. For example, a JavaScript probe may be executed by the agent device 320 to invoke 520 a search of data associated with the private network to obtain the search result. For example, if the observable includes a MD5 hash of a file, the search may include generating hashes of files on a network device to determine whether the MD5 hash of the observable matches a hash of a file of the network device. For example, the search result may include records returned from a log store for the private network, where the returned records have one or more fields matching the observable. For example, the search result may include discovery probe data that is found to include an occurrence of the observable. In some implementations, the search result may include records or other data received from a plurality of sources (e.g., computing devices) within the private network.

The example technique 500 includes aggregating 530 data from the search result that matches the observable to obtain aggregated data. For example, the data from the search result may be aggregated 530 by a device (e.g., the agent device 320) operating within the private network. In some implementations, aggregating 530 data from the search result may include identifying, based on the search result, one or more indicators of compromise associated with the observable. For example, an indicator of compromise may include the observable and additional conditions, such as additional observables, that are found to occur in the private network. An identified indicator of compromise (IoC) may be included in a report sent back to an external server device in response to the message. In some implementations, aggregating 530 data from the search result may include paging through the search result; counting occurrences of the observable in the search result; bucketing the occurrences of the observable by time; and identifying, based on the search result, one or more hosts associated with the observable. For example, some occurrences of an observable may be associated with a time (e.g., encoded in an associated timestamp). In some implementations, an analysis window of time may be partitioned into a plurality of time intervals. Occurrences of the observable may be bucketed into the time interval corresponding to their respective time of occurrence. Counts of the occurrences of the observable for the time intervals may be determined. These counts by time interval may be used to generate a histogram of occurrences of the observable. In some implementations, specific times associated with occurrences are collected and included in the aggregated data while other sensitive portions of the data from the search result are omitted. For example, data may be aggregated across computing devices in the computing network (e.g., omitting IP addresses and/or host names from the aggregated data) and specific times associated with occurrences of the observable may be collected and included in the aggregated data. For example, aggregating 530 data from the search result, may result in aggregated data that may be included in or form a basis of the report of relevant information to an external server device. For example, the aggregated data may include one or more counts of occurrences of the observable found in data of the private network and/or identification of one or more components associated with an occurrence of the observable. In some implementations, aggregating 530 the data from the search result may extract relevant information about the observable from the search result, while omitting some sensitive data (e.g., e.g., local IP addresses or user credentials) associated with individual occurrences of the observable. For example, a JavaScript probe may be executed by the agent device 320 to aggregate 530 data from the search result that matches the observable.

The example technique 500 includes generating 540 a report based on the aggregated data from the search result. The report may include an indication of the observable, a count of occurrences of the observable, and identification of one or more components associated with the observable. For example, the one or more components associated with the observable may include a host that is associated with a configuration item maintained by the server. The report may include timestamps for respective occurrences of the observable in the search result. The report may include a histogram of occurrences of the observable bucketed by time intervals. The indication of the observable may directly or indirectly identify the observable. For example, the indication of the observable may be a copy of the observable or an identifier associated with the observable. For example, the count of occurrences of the observable may be a total count of all occurrences of the observable found in searches of data of the private network. In some implementations, the count of occurrences of the observable may be one of multiple counts of the observable. For example, occurrences of an observable may be associated with respective times (e.g., having timestamps) and counts of the observable occurring within respective time intervals of an analysis period may be determined and include in the report. These counts, including the count, may comprise a histogram. For example, the one or more components may be software components and/or hardware components in the private network. For example, the one or more components may be represented by configuration items in a configuration management database (e.g., the CMDB 332). For example, the identification of one or more components associated with the observable may include one or more host names of devices (e.g., target device 1 312 or target device N 314) in the private network. For example, the report may include an identified indicator of compromise. The report may omit sensitive data that is not needed by a system implementing the technique 400 to facilitate sightings searches and associated network security functions. In this manner, network security risks caused by exfiltration of sensitive data outside of the private network may be avoided or mitigated. In some implementations, a report may be generated 540 that includes only the unmodified aggregated data formatted for transmission. For example, a JavaScript probe may be executed by the agent device 320 to generate 540 the report based on the aggregated data from the search result.

The example technique 500 includes transmitting 550 the report to the server. The report may be transmitted 550 using a network interface that is connected to the private network. For example, the report may be transmitted 550 by the agent device 320 operating in a private network of the customer infrastructure 302 to the platform instance 330 running on an application server (e.g., the application server 112) operating in the provider infrastructure 308, outside of the private network. For example, the report may be transmitted 550 using a network interface (e.g., the network communication unit 218).

Although the technique 500 is shown as a series of operations for clarity, implementations of the technique 500 or any other technique, process, or algorithm described in connection with the implementations disclosed herein can be performed in various orders or concurrently. Additionally, operations in accordance with this disclosure can be performed with other operations not presented and described herein. For example, an operation to receive instructions (e.g., a JavaScript probe) for implementing the invoking 520 search operation and/or the aggregating 530 operation may be added to augment the technique 500. Furthermore, one or more aspects of the systems and techniques described herein can be omitted. For example, the aggregating 530 operation and the generating 540 operation may be combined in single operation.

Figure 6:
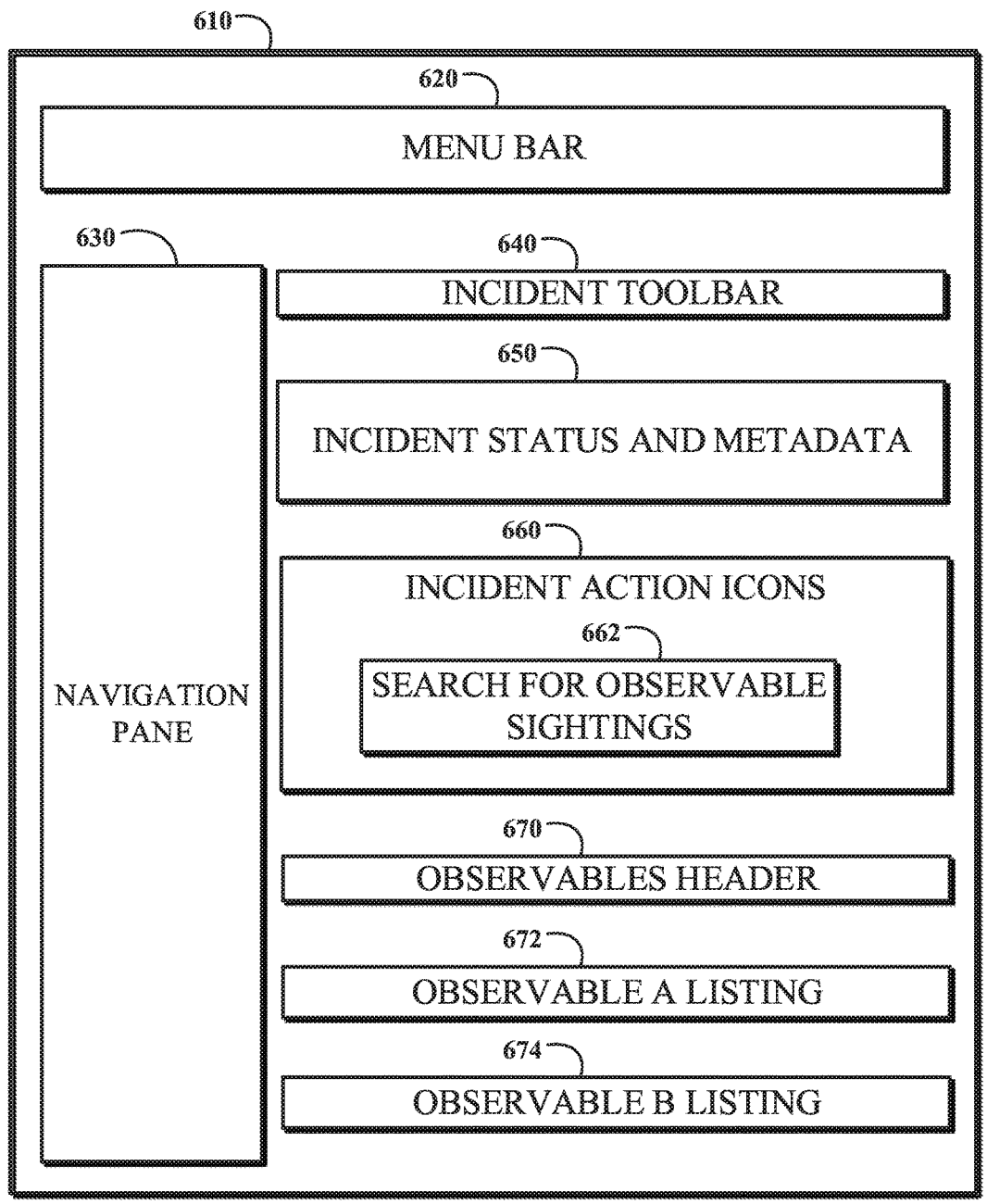
FIG. 6 is a diagram of an example display region generated for presenting information about a network security incident, including related observables, and providing a user interface to facilitate response to the network security incident.

FIG. 6 is a diagram of an example display region 610 generated for presenting information about a network security incident, including related observables, and providing a user interface to facilitate response to the network security incident. The display region 610 includes a menu bar 620; a navigation pane 630, an incident toolbar 640; incident status and metadata 650; incident action icons 660, including a search for observable sightings icon 662; an observables header 670; and observable listings 672 and 674. For example, the display region 610 may be generated by the user interface 338 of FIG. 3.

The menu bar 620 may include a user icon reflecting the status of a currently logged in user, a search icon, a chat icon, a help icon, a setup icon, and an options icon. The navigation pane 630 may include a search box, a favorites icon, and a site map or tree. The incident toolbar 640 may include a network security incident identification icon with a drop-down menu for selecting recently viewed network security incidents. The incident toolbar 640 may also include an attachment icon for uploading files, a settings icon, a drop-down menu for selecting status update notification options for the network security incident, an update icon for pulling the latest data for the network security instance from a database (e.g., the security incident database 334), an add response task icon, a cancel icon, and a delete icon.

The incident status and metadata 650 displays numerous fields of information about the network security incident. The incident status and metadata 650 may display a number or other identifier for the network security incident; identification (e.g., a name) of a user who requested the network security incident; an identifier with a link for a configuration item associated with the network security incident; an identifier of an affected user; a location; a category (e.g., reconnaissance activity); a subcategory (e.g., port scanning); a date and time when the network security incident was opened; a current state of the response to the network security incident (e.g., draft, analysis, contain, eradicate, recover, review, or closed); a sub-state; a source (e.g., network monitoring); a risk score (e.g., determined 450 as described in relation to FIG. 4); a risk score manual override icon; a business impact ratings or score (e.g., 1—critical); a priority (e.g., 1—critical); an assignment group that identifies a group of users responsible for responding to the security incident; an assignment that identifies a user primarily responsible for responding to the security incident; and a short description string (e.g., "Port scanning of our payment gateway"). The incident status and metadata 650 portion of the display region 610 may enable users to view and/or edit some of the status and information and metadata for the network security incident, depending on permissions associated with the user.

The incident action icons 660 include a search for observable sightings icon 662 that can be used by a user (e.g., a system administrator) to request that a platform instance (e.g., the platform instance 330) initiate a sightings search for information of a private network related to an observable. For example, when a user activates (e.g., clicks on) the search for observable sightings icon 662, a sightings search for one or more observables selected in the observable listings (e.g., the observable A listing 672 and the observable B listing 674) using the technique 400 of FIG. 4. The incident action icons 660 may also include a view manual run-book icon, a response workflow icon, a scan for vulnerabilities icon, an add multiple observables icon, a force to update set icon, a run orchestration icon.

The observables header 670 may list column headings that may include names for attributes of observables that are displayed in the area of the display region 610 below the observables header 670. The observables header 670 may also include icons for adding and editing observable records associated with the network security incident and for performing other actions on selected observables in the listing below. The area of the display region 610 below the observables header 670 may include one or more observable listings for observables associated with the network security incident. In this example, two observable listings 672 and 674 are displayed below the observable header 670. The observable listings 672 and 674 may display values of attributes of corresponding observables. For example, an observable listing (e.g., listing 672 or listing 674) may include an identifier of an observable; a date and time when the observable record was last updated; an information icon; and observable selection icon (e.g., a check box or radial button).

Figure 7:
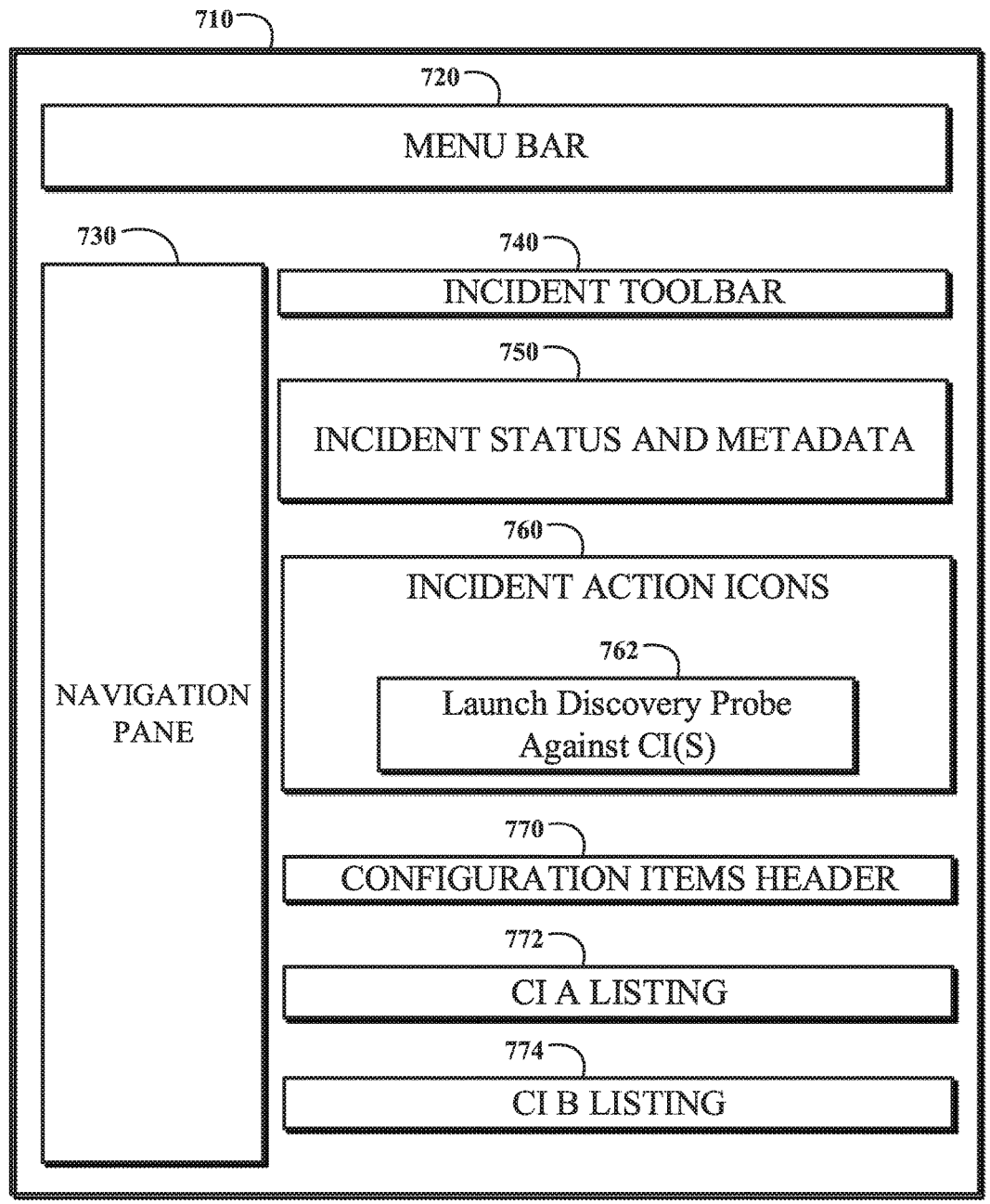
FIG. 7 is a diagram of an example display region generated for presenting information about a network security incident, including configuration items, and providing a user interface to facilitate response to the network security incident.

FIG. 7 is a diagram of an example display region 710 generated for presenting information about a network security incident, including configuration items, and providing a user interface to facilitate response to the network security incident. The display region 710 includes a menu bar 720; a navigation pane 730, an incident toolbar 740; incident status and metadata 750; incident action icons 760, including a launch discovery probe against CI(s) icon 762; a configuration items header 770; and CI listings 772 and 774. For example, the display region 710 may be generated by the user interface 338 of FIG. 3.

The menu bar 720 may include a user icon reflecting the status of a currently logged in user, a search icon, a chat icon, a help icon, a setup icon, and an options icon. The navigation pane 730 may include a search box, a favorites icon, and a site map or tree. The incident toolbar 740 may include a network security incident identification icon with a drop-down menu for selecting recently viewed network security incidents. The incident toolbar 740 may also include an attachment icon for uploading files, a settings icon, a drop-down menu for selecting status update notification options for the network security incident, an update icon for pulling the latest data for the network security instance from a database (e.g., the security incident database 334), an add response task icon, a cancel icon, and a delete icon.

The incident status and metadata 750 displays numerous fields of information about the network security incident. The incident status and metadata 750 may display a number or other identifier for the network security incident; identification (e.g., a name) of a user who requested the network security incident; an identifier with a link for a configuration item associated with the network security incident; an identifier of an affected user; a location; a category (e.g., reconnaissance activity); a subcategory (e.g., port scanning); a date and time when the network security incident was opened; a current state of the response to the network security incident (e.g., draft, analysis, contain, eradicate, recover, review, or closed); a sub-state; a source (e.g., network monitoring); a risk score (e.g., determined 450 as described in relation to FIG. 4); a risk score manual override icon; a business impact ratings or score (e.g., 1—critical); a priority (e.g., 1—critical); an assignment group that identifies a group of users responsible for responding to the security incident; an assignment that identifies a user primarily responsible for responding to the security incident; and a short description string (e.g., "Port scanning of our payment gateway"). The incident status and metadata 750 portion of the display region 710 may enable users to view and/or edit some of the status and information and metadata for the network security incident, depending on permissions associated with the user.

The incident action icons 760 include a launch discovery probe against CI(s) icon 762 that can be used by a user (e.g., a system administrator) to request that a platform instance (e.g., the platform instance 330) initiate a discovery probe against a computing resource represented by a configuration item that has been associated with the network security incident. For example, when a user activates (e.g., clicks on) the launch discovery probe against CI(s) icon 762, a discovery probe may be initiated against components represented by one or more configuration items selected in the configuration item listings (e.g., the CI A listing 772 and the CI B listing 774). The incident action icons 760 may also include a view manual run-book icon, a response workflow icon, a scan for vulnerabilities icon, an add multiple observables icon, a force to update set icon, a run orchestration icon.

The configuration items header 770 may list column headings that may include names for attributes of configuration items that are displayed in the area of the display region 710 below the configuration items header 770. The configuration items header 770 may also include icons for adding and editing configuration item records associated with the network security incident and for performing other actions on selected configuration items in the listing below. The area of the display region 710 below the configuration items header 770 may include one or more configuration item listings for configuration items associated with the network security incident. In this example, two configuration item listings 772 and 774 are displayed below the configuration items header 770. The configuration item listings 772 and 774 may display values of attributes of corresponding configuration item. For example, a configuration item listing (e.g., CI A listing 772 or CI B listing 774) may include an identifier (e.g., a name with a link) of an configuration item; a date and time when the configuration item record was applied or associated with the network security incident; a Boolean variable specifying whether the configuration item was manually applied or associated with the network security incident; an XML, field; an information icon; and configuration item selection icon (e.g., a check box or radial button).

An implementation of this disclosure is a system for finding and locally analyzing information relevant to network security incidents within a private network and reporting aggregated results to an external software as a service provider. The system includes a means for receiving, at a computing device located within a private network, a message sent from a server located outside of the private network, the message including an observable; a means for invoking, within the private network, a search of data associated with the private network to obtain a search result that includes data matching the observable; a means for aggregating, within the private network, data from the search result that matches the observable to obtain a report that includes an indication of the observable, a count of occurrences of the observable, and identification of one or more components associated with the observable; and a means for transmitting the report to the server.

All or a portion of the implementations of the systems and techniques described herein can be implemented using a multi-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other multi- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system located in a private network operable to find information relevant to network security incidents and generate aggregated results for transmission, the system comprising:
    a network interface that is connected to the private network;
    a memory; and
    a processor, wherein the memory includes instructions executable by the processor to cause the system to:
        receive a message sent from a server located outside of the private network, the message including an observable, wherein the observable comprises data representing properties or events related to an operation of networks or network-connected devices;
        invoke, within the private network, a search of data to obtain a search result that includes data matching the observable;
        omit sensitive components of the search result that are not required by a service provider to implement a security service by aggregating a subset of the search result into aggregated data;
        generate, based on the aggregated data, a report that includes an indication of the observable, a count of occurrences of the observable, and identification of one or more components associated with the observable, wherein the one or more components comprise one or more software components of the private network, one or more hardware components of the private network, or any combination thereof; and
        transmit the report to the server located outside the private network.

2. The system of claim 1, wherein the instructions for aggregating data from the search result include instructions executable by the processor to cause the system to:
    page through the search result;
    count occurrences of the observable in the search result;
    bucket the occurrences of the observable by time; and
    identify, based on the search result, one or more hosts associated with the observable.

3. The system of claim 1, wherein the instructions for aggregating data from the search result include instructions executable by the processor to cause the system to:
    identify, based on the search result, one or more indicators of compromise associated with the observable; and
    include the identified indicators of compromise in the report.

4. The system of claim 1, wherein the instructions for invoking a search of data associated with the private network include instructions executable by the processor to cause the system to:
    invoke a search of a log store within the private network, wherein the log store comprises information from multiple data sources within the private network.

5. The system of claim 1, wherein the instructions for invoking a search of data associated with the private network include instructions executable by the processor to cause the system to:
    invoke multiple searches, including follow up searches based on an initial search result.

6. The system of claim 1, wherein the report includes timestamps for respective occurrences of the observable in the search result.

7. The system of claim 1, wherein the report includes a histogram of occurrences of the observable bucketed by time intervals.

8. The system of claim 1, wherein the one or more components associated with the observable include a host that is associated with a configuration item maintained by the server.

9. The system of claim 1, wherein the instructions include a JavaScript probe.

10. A method for finding, within a private network, information relevant to network security incidents and obtaining aggregated results for transmission to a server located outside the private network, the method comprising:
    receiving, at a computing device located within the private network, a message sent from a server located outside of the private network, the message including an observable, wherein the observable comprises data representing properties or events related to an operation of networks or network-connected devices;
    invoking, within the private network, a search of data to obtain a search result that includes data matching the observable;
    omitting sensitive components of the search result that are not required by a service provider to implement a security service by aggregating a subset of the search result into aggregated data;
    generating, based on the aggregated data, a report that includes an indication of the observable, a count of occurrences of the observable, and identification of one or more components associated with the observable, wherein the one or more components comprise one or more software components of the private network, one or more hardware components of the private network, or any combination thereof; and
    transmitting the report to the server located outside the private network.

11. The method of claim 10, wherein aggregating data from the search result comprises:
    paging through the search result;
    counting occurrences of the observable in the search result;
    bucketing the occurrences of the observable by time; and
    identifying, based on the search result, one or more hosts associated with the observable.

12. The method of claim 10, wherein invoking a search of data associated with the private network comprises:
    invoking a search of a log store within the private network, wherein the log store comprises sensitive information and insensitive information associated with the sensitive components.

13. The method of claim 10, wherein invoking a search of data associated with the private network comprises:
    invoking multiple searches, including follow up searches based on an initial search result.

14. A system operable to gather information relevant to network security incidents, the system comprising:
    a network interface that is connected to a first network, wherein the first network is outside of a private network;
    a memory; and
    a processor, wherein the memory includes instructions executable by the processor to cause the system to:
        transmit a message to an agent device connected to the private network, the message including an observable, wherein the observable comprises data representing properties or events related to an operation of networks or network-connected devices;
        receive a report from the agent device, wherein the report is generated based on a search of data stored within the private network, wherein the search of data is configured to generate a search result, wherein the report is generated by the agent device in response to the message, wherein the report includes an indication of the observable, a count of occurrences of the observable, and identification of one or more components associated with the observable, wherein the one or more components comprise one or more software components of the private network, one or more hardware components of the private network, or any combination thereof, and wherein the report omits sensitive components of the search result that are not required by a service provider associated with the system to implement a security service; and store data associating the one or more components with the observable.

15. The system of claim 14, wherein the memory includes instructions executable by the processor to cause the system to:

determine a score for a network security incident associated with the observable based on the count of occurrences of the observable, wherein the score estimates an impact of the network security incident on the private network.

16. The system of claim 14, wherein the memory includes instructions executable by the processor to cause the system to:

present, to a user, information about a network security incident that is associated with the observable;

receive a command from the user to perform a search based on the observable; and wherein the message is transmitted responsive to the command.

17. The system of claim 14, wherein the memory includes instructions executable by the processor to cause the system to:

receive an alert based on network security threat information shared among a group of associated private networks that includes the private network, wherein the alert includes the observable; and wherein the message is transmitted responsive to the alert.

18. The system of claim 14, comprising a configuration management database and wherein the one or more components are represented by configuration items in the configuration management database.

19. The system of claim 14, wherein the memory includes instructions executable by the processor to cause the system to:

identify, based on the report, a relationship between a network security incident associated with the observable and a configuration item representing one of the one or more components in the private network.

20. The system of claim 14, wherein the memory includes instructions executable by the processor to cause the system to:

identify, based on the report, one or more hosts in the private network that are associated with occurrences of the observable; and determine a score for a network security incident associated with the observable based on the identification of the one or more hosts, wherein the score corresponds to a predicted impact of the network security incident.

* * * * *